United States Patent
Kasperchik et al.

(10) Patent No.: US 6,464,348 B1
(45) Date of Patent: Oct. 15, 2002

(54) BASE MATERIALS FOR A CLEAR PROTECTIVE OVERCOAT ON INKJET IMAGES

(75) Inventors: Vladek P Kasperchik, Corvallis, OR (US); David M Kwasny, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 2 days.

(21) Appl. No.: 09/712,694

(22) Filed: Nov. 13, 2000

(51) Int. Cl.[7] .................................................. B41J 2/01

(52) U.S. Cl. ........................................ 347/101; 347/105

(58) Field of Search ................................ 347/100, 101, 347/105, 102; 428/195

(56) References Cited

U.S. PATENT DOCUMENTS

| | | | | |
|---|---|---|---|---|
| 4,738,555 A | | 4/1988 | Nagashima | 400/240 |
| 5,380,769 A | * | 1/1995 | Titterington et al. | 347/96 |
| 5,534,907 A | * | 7/1996 | Tsutsui et al. | 347/175 |
| 5,549,740 A | * | 8/1996 | Takahashi et al. | 347/100 |
| 5,555,011 A | | 9/1996 | Tang et al. | 347/212 |
| 5,612,777 A | | 3/1997 | Malhotra | 399/226 |
| 5,847,738 A | * | 12/1998 | Tutt et al. | 347/101 |
| 5,906,905 A | | 5/1999 | Malhotra | 430/97 |
| 5,954,906 A | | 9/1999 | Abe et al. | 156/247 |
| 6,357,871 B1 | * | 3/2002 | Ashida et al. | 347/101 |

* cited by examiner

*Primary Examiner*—John Barlow
*Assistant Examiner*—Manish S. Shah
(74) *Attorney, Agent, or Firm*—W. Bradley Haymond

(57) ABSTRACT

The use of thermoplastic ionomers to form a clear protective overcoating layer over an offset, inkjet or xerographic printed image.

32 Claims, No Drawings

BASE MATERIALS FOR A CLEAR PROTECTIVE OVERCOAT ON INKJET IMAGES

FIELD OF INVENTION

The present invention relates to the use of thermoplastic ionomer-based clear toners to create a clear overcoating for inkjet printed images.

BACKGROUND OF INVENTION

The use of inkjet printing systems has grown dramatically in recent years. This growth may be attributed to substantial improvements in print resolution and overall print quality coupled with appreciable reduction in cost. Today's inkjet printers offer acceptable print quality for many commercial, business, and household applications at costs fully an order of magnitude lower than comparable products available just a few years ago. Notwithstanding their recent success, intensive research and development efforts continue toward improving inkjet print quality, while further lowering cost to the consumer.

An inkjet image is formed when a precise pattern of dots is ejected from a drop-generating device known as a "printhead" onto a printing medium. The typical inkjet printhead has an array of precisely formed nozzles located on a nozzle plate and attached to an inkjet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 $\mu$m×35 $\mu$m. The printhead is held and protected by an outer packaging referred to as a print cartridge, i.e., inkjet pen.

Upon energizing of a particular resistor element, a droplet of ink is expelled through the nozzle toward the print medium, whether paper, transparent film or the like. The firing of ink droplets is typically under the control of a microprocessor, the signals of which are conveyed by electrical traces to the resistor elements, thereby forming alphanumeric and other characters on the print medium.

The need exists to protect and stabilize inkjet printed images against scratch and image resistance and against unwanted retransfer of ink from the inkjet image to unwanted surfaces.

Tutt & Tunney (U.S. Pat. No. 5,847,738, issued on Jan. 8, 1999 and assigned to Eastman Kodak Co.) disclose a process for applying a protective overcoat on an inkjet printed media. The protective coat is obtained through:

a) Charging the printed imaged element to a given polarity or applying a voltage across the surface of the element which is attracted to a conductive surface behind the element;

b) Applying colorless charged particles to the imaged element which causes them to be electrostatically attracted to the surface of the image layer; and c) Heat-fusing the particles to obtain a protective overcoat over the entire surface of the image layer.

Colorless toner particles well-known in electrophotography are used in the coating process of Tutt & Tunney. Examples of materials mentioned in the patent are: chlorinated polyolefins, polyacrylic acid esters, cellulose derivatives, modified alkyd resins, polyesters, polyurethanes, poly(vinyl acetate), polyamides, ketone resins, (polyvinylbutyral, copolymers of vinyl polymers with methacrylates or acrylates, low molecular weight polyethylene, copolymers with siloxanes, polyalkenes, and poly(styrene-co-butyl acrylate), etc.

In a preferred embodiment in Tuft & Tunney's disclosure, the colorless particles are made of either a polyester or poly(styrene-co-butyl acrylate). In order to achieve easy fusibility of these particles during the overcoat formation and obtain a highly glossy surface, polymers used in electrophotographic toners should have low melt viscosity. This would mean using polymers of relatively low molecular weight (from~a few thousand to 15,000). As a result, brittle coatings with relatively poor flexibility and hence inferior abrasion resistance are likely. If, in order to increase abrasion resistance, crosslinked, branched or higher molecular weight polymers were used, the melt viscosity would be high. Furthermore, covalent cross-linking during the overcoat fusing process would be irreversible, thus leading to a dramatic increase of melt viscosity. This in turn would lead to an overcoat with poor gloss and non-uniform thickness.

Nagashima (U.S. Pat. No. 4,738,555 assigned to Toshiba) discloses the use of a thermal print ribbon to thermally transfer and laminate a transparent protective layer of wax, vinyl chloride, vinyl acetate, acrylic resin, styrene or epoxy on the printed image portion of a record substrate.

Tang et al. (U.S. Pat. No. 5,555,011 assigned to Eastman Kodak) disclose a method of laminating, using a thermally-transferable polymeric material, a transparent protective layer over an ink-printed image on a substrate.

Abe et al. (U.S. Pat. No. 5,954,906 assigned to Canon) discloses a method for protecting and covering a printed material on a substrate with a pressure-sensitive transferring protective covering material with at least (a) a first flexible substrate, (b) an adhesive layer, (c) a solid resin layer, and (d) a second flexible substrate, stacked in this order.

Malhotra (U.S. Pat. No. 5,612,777 assigned to Xerox) discloses a method of applying a clear, scratch-resistant, lightfast coating for a substrate having photocopied color images by first, depositing color toner images on a charge retentive surface; second, depositing a clear polymer toner material onto the charge retentive surface; and third, fusing the color toner images and clear polymer toner material onto a substrate.

Another Malhotra patent (U.S. Pat. No. 5,906,905 assigned to Xerox) discloses a method of creating photographic quality prints using imaging such as xerography or ink jet by, first, reverse reading toner images on a transparent substrate and then adhering the transparent substrate to a coated backing sheet, coated with a polymeric lightfastness material.

Typically, clear toner materials currently used in the industry are based on a few basic polymer types. In the table below are listed the advantages and disadvantages of these materials when used as an overcoat for inkjet printed images:

| Toner based on: | Advantages | Disadvantages |
| --- | --- | --- |
| Styrenated Acrylics | Good Elasticity & Toughness | Poor Fusability (high softening temperature); Poor gloss and clarity |
| Low MW Polyesters | Low melting temperature; low | Very poor mechanical properties (no flexibility and |

-continued

| Toner based on: | Advantages | Disadvantages |
|---|---|---|
| | melt viscosity; good clarity; fair gloss | abrasion resistance); poor resistance to inkjet ink solvents |
| Polyolefins | Good fusibility; good elasticity | Poor abrasion resistance; Poor clarity and gloss; waxy feel |

Thermoplastic ionomers have been used for films, coatings and molded articles. They are known for their good impact strength, high melt viscosity, high melt strength, good transparency and relatively low continuous service temperatures. As thin films, they have high tear strengths with a combination of toughness and good abrasion resistance, as well as good adhesion on impact, which makes them a good surface covering for shoe soles, shoe heels, golf ball covers, bowling pin covers and glass bottles. In such applications, the ionomer coatings are extruded or blow molded. There has previously been no attempt to use thermoplastic ionomers as a coating material for printed images, since the extrusion and/or blow molding processes conventionally used with ionomers do not lend themselves to such application.

SUMMARY OF THE INVENTION

The present invention relates to a method of using thermoplastic ionomers to form a clear protective coating on color toner image printed by offset, inkjet or xerographic means.

The present invention also relates to a protective coating comprising thermoplastic ionomers wherein the protective coating is formed on color toner image printed by offset, inkjet or xerographic means.

The present invention also relates to an apparatus for creating color toner images, said apparatus comprising:
  a) means including a plurality of developer housings for forming color toner images on a charge retentive surface;
  b) means including a developer housing for depositing a protective coating composition comprising a clear polymer material on said charge retentive surface prior to the formation of said color toner images thereon, said clear polymer material comprising thermoplastic ionomers.

The present invention also relates to an inkjet printing apparatus comprising:
  at least one printhead portion, the printhead portion having at least one ejector portion; and
  at least one reservoir portion having at least one reservoir chamber, the reservoir chamber providing fluid to the at least one ejector portions, and the at least one reservoir chamber including an ink composition comprising an aqueous solvent and at least one colorant;
wherein after the ink composition is ejected from the inkjet to form a printed image on a substrate are mixed together to form a mixture, a clear protective overcoat comprising thermoplastic ionomer is applied over the printed image on the substrate.

The present invention further relates to a thermal printer adapted to receive an ink-receiver substrate and an ink-donor web which includes a patch of thermally-transferable laminate material that can be applied onto the receiver medium over the dye image to form a protective layer, said thermal printer comprising:

a thermal printhead;

a transport system for moving received ink-receiver substrate and received ink-donor web past the thermal print head to transfer an ink image to the received ink-receiver medium;

means defining respective paths for the received ink-donor web and the received ink-receiver substrate, said paths converging in a forward direction, to a position at which they abut, before proceeding past the thermal print head;

drive means, as a part of the transport system, for moving the received ink-donor web and the received ink-receiver substrate (i) in said forward direction along their respective paths past the thermal head whereat heat from the thermal head causes an area of the laminate material coating between a leading edge of the area and a trailing edge of the area to transfer from the received ink-donor web to the received ink-receiver medium over the transferred dye image and (ii) in a reverse direction along their respective paths; and means for causing the trailing edge of the transferred area of the laminate material coating to break cleanly away from a portion of the laminate material coating not transferred from received web support to received ink-receiver substrate, leaving the trailing edge straight and even; and wherein the laminate material comprises thermoplastic ionomer.

DETAILED DESCRIPTION OF THE INVENTION

The present invention described herein is directed to inkjet inks for printing inkjet images and overcoat materials to protect the images using commercially available inkjet printers such as, for example but not limited to, HP Desk-Jet® printers, manufactured by Hewlett-Packard Company, of Palo Alto, Calif. The inks and fixer fluids enable production of near photographic images having little or no coalescence, excellent waterfastness, and reduced dry time, on a range of print media, in particular, for example but not limited to, plain white, 8½"×11", 20 lb. weight, printer paper conventionally used for office and home computers.

The present invention relates to using thermoplastic ionomers as clear toner materials for inkjet print overcoats. Thermoplastic ionomers are polymers containing both covalent (within the molecule) and ionic (between polymer molecules) bonds. The ionomer polymers have much lower content of ionic bonds than covalent ones. Also, unlike covalent bonds, ionic bonds reversibly dissociate when the polymer melts. Thus, ionomers tend to behave like thermoplastics in the molten state and like cross-linked polymers in the solid state.

Depending on the degree of ionic cross-linking in the material, the melt viscosity and mechanical properties of the solid material may vary within a very wide range. The capability of achieving a wide range of variance of these properties presents an excellent opportunity to fine tune the mechanical properties of the overcoat by varying the content of the ionic groups in the polymer.

In an overcoating layer made by fusion of ionomer-based toner with a surface containing inkjet printed images, it is thus possible to achieve the following qualities at the same time:

1. Fair to good flowability in the molten state;
2. Relatively low melting temperature (depending on the type of polymer);

3. Excellent elasticity;
4. Good abrasion resistance and toughness;
5. Good clarity (ionic cross-links prevent formation of large polymer crystals responsible for haziness of many crystalline polymers);
6. High gloss;
7. Good adhesion to the inkjet media surface (interaction of polymer ionic groups with ionic/polar groups of the substrate's surface);
8. Good resistance to both water and organic solvents.

The above qualities are in contrast to the qualities of conventional toners used for clear overcoating in inkjet. As discussed in the background section, such conventional toners have serious disadvantages. Styrenated acrylics have the disadvantage of poor fusibility (high softening temperature) and poor gloss and clarity. Low molecular weight polyesters have very poor mechanical properties (no flexibility and abrasion resistance) and poor resistance to inkjet ink solvents. Polyolefins have poor abrasion resistance, poor clarity and gloss as well as a waxy feel.

In one of its embodiments, the present invention relates to a method of using thermoplastic ionomers to form a clear protective coating on color toner image printed by offset, inkjet or xerographic means.

In a preferred embodiment, the above method comprises the steps of:

a) applying ink to a substrate to form an imaged element;
b) either charging said imaged element to a given polarity or applying a voltage across the surface of said element which is attracted to a conductive surface behind said element;
c) applying charged particles of thermoplastic ionomers to said element which causes the particles to be electrostatically attracted to the surface of said imaged element; and
d) heat-fusing said particles to obtain a clear protective coating over the entire surface of said imaged element.

In another preferred embodiment, the above method comprises the steps of:

a) applying ink to a substrate to form an imaged element; and
b) laminating a protective coating comprised of thermoplastic ionomers over the inkjet printed image by advancing the substrate and a laminate material past a heat source such that a portion of a patch of laminate material is applied to the substrate over the inkjet printed image.

In yet another preferred embodiment, the above method comprises the steps of:

a) forming color toner images on a charge retentive surface using a plurality of developer housings;
b) using a developer housing, depositing a protective coating comprising a clear, thermoplastic ionomer on said charge retentive surface; and
c) fusing said toner images and said composition to a substrate.

In still another preferred embodiment, the above method comprises the steps of:

a) providing a coated transparent substrate having a wrong reading, color toner image formed thereon; and
b) providing a backing member to said transparent substrate, wherein, the transparent substrate is coated with a protective coating comprised of thermoplastic ionomer.

In another preferred embodiment of the above method, the thermoplastic ionomers have the structure

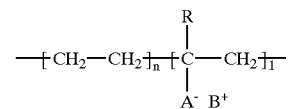

where n is from 10 to 20; R is selected from —H and —CH$_3$; A$^-$ is an anionic group and B$^+$ is a cationic group. In a more preferred embodiment, A$^-$ is selected from the group consisting of carboxylic acids, sulfonic acids, phosphonic acids and thioglycolic acids. In another more preferred embodiment, B$^+$ is selected from the group consisting of Na$^+$, K$^+$, Li$^+$ and Zn$^{2+}$. In yet another more preferred embodiment, the thermoplastic ionomers are selected from a group consisting of ethylene copolymers of methacrylic acid, ethylene copolymers of methacrylate salt, ethylene copolymers of acrylic acid, ethylene copolymers of acrylate salt and combinations thereof.

In another of its embodiments, the present invention relates to a protective coating comprising thermoplastic ionomers, the protective coating being formed on color toner image printed by offset, inkjet or xerographic means.

In a preferred embodiment, the thermoplastic ionomers in the above protective coating have the structure

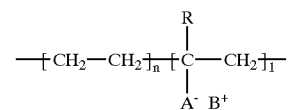

where n is from 10 to 20; R is selected from —H and —CH$_3$; A$^-$ is an anionic group and B$^+$ is a cationic group. In a more preferred embodiment of the protective coating, A$^-$ is selected from the group consisting of carboxylic acids, sulfonic acids, phosphonic acids and thioglycolic acids. In another more preferred embodiment of the protective coating, B$^+$ is selected from the group consisting of Na$^+$, K$^+$, Li$^+$ and Zn$^{2+}$. In yet another more preferred embodiment of the protective coating, the thermoplastic ionomers are selected from a group consisting of ethylene copolymers of methacrylic acid, ethylene copolymers of methacrylate salt, ethylene copolymers of acrylic acid, ethylene copolymers of acrylate salt and combinations thereof.

In another of its embodiments, the invention relates to an apparatus for creating color toner images, said apparatus comprising:

a) means including a plurality of developer housings for forming color toner images on a charge retentive surface;
b) means including a developer housing for depositing a protective coating composition comprising a clear polymer material on said charge retentive surface prior to the formation of said color toner images thereon, said clear polymer material comprising thermoplastic ionomers.

In yet another of its embodiments, the invention relates to an inkjet printing apparatus comprising:

at least one printhead portion, the printhead portion having at least one ejector portion; and
at least one reservoir portion having at least one reservoir chamber, the reservoir chamber providing fluid to the at least one ejector portions, and the at least one reservoir chamber including an ink composition comprising an aqueous solvent and at least one colorant;

wherein after the ink composition is ejected from the inkjet to form a printed image on a substrate are mixed together to form a mixture, a clear protective overcoat comprising thermoplastic ionomer is applied over the printed image on the substrate.

In another of its embodiments, the invention relates to a thermal printer adapted to receive an ink-receiver substrate and an ink-donor web which includes a patch of thermally-transferable laminate material that can be applied onto the receiver medium over the dye image to form a protective layer, said thermal printer comprising:

a thermal printhead;

a transport system for moving received ink-receiver substrate and received ink-donor web past the thermal print head to transfer an ink image to the received ink-receiver medium;

means defining respective paths for the received ink-donor web and the received ink-receiver substrate, said paths converging in a forward direction, to a position at which they abut, before proceeding past the thermal print head;

drive means, as a part of the transport system, for moving the received ink-donor web and the received ink-receiver substrate (i) in said forward direction along their respective paths past the thermal head whereat heat from the thermal head causes an area of the laminate material coating between a leading edge of the area and a trailing edge of the area to transfer from the received ink-donor web to the received ink-receiver medium over the transferred dye image and (ii) in a reverse direction along their respective paths; and means for causing the trailing edge of the transferred area of the laminate material coating to break cleanly away from a portion of the laminate material coating not transferred from received web support to received ink-receiver substrate, leaving the trailing edge straight and even;

and wherein the laminate material comprises thermoplastic ionomer.

In a preferred embodiment of all of the above apparatus embodiments, the thermoplastic ionomers have the structure

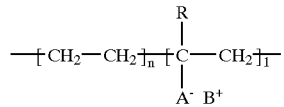

where n is from 10 to 20; R is selected from —H and —CH$_3$; A is an anionic group and B$^+$ is a cationic group. In a more preferred embodiment, A$^-$ is selected from the group consisting of carboxylic acids, sulfonic acids, phosphonic acids and thioglycolic acids. In another more preferred embodiment, B$^+$ is selected from the group consisting of Na$^+$, K$^+$, Li$^+$ and Zn$^{2+}$. In yet another more preferred embodiment, the thermoplastic ionomers are selected from a group consisting of ethylene copolymers of methacrylic acid, ethylene copolymers of methacrylate salt, ethylene copolymers of acrylic acid, ethylene copolymers of acrylate and combinations thereof.

EXAMPLES

Example 1

A powder form of ethylene-methacrylic acid/salt copolymer, a thermoplastic ionomer, was used as clear toner.

The clearcoat particles were properly charged within an electrostatic developer and then electrostatically projected upon inkjet printed image. The mass level of the projected clearcoat particles was sufficient to provide the necessary overcoat thickness. The overcoating powder layer was then fused using a heated roller (~120–140° C.).

The resulting clear overcoat layer (~1.0–3.0 mil) was tough, very flexible and scratch resistant. It was of high clarity and gloss (~70–80%). The overcoat thus obtained was resistant to water and organic solvents at ambient temperature.

While the foregoing invention has been described in some detail for purposes of clarity and understanding, it will be clear to one skilled in the art from the reading of this disclosure that various changes in form and detail can be made without departing from the true scope of the invention.

What is claimed is:

1. A method of using thermoplastic ionomers to form a clear protective coating on color toner image printed by offset, inkjet or xerographic means, comprising the steps of:
    a) forming color toner images on a charge retentive surface using a plurality of developer housings;
    b) using a developer housing, depositing a protective coating comprising a clear, thermoplastic ionomer on said charge retentive surface; and
    c) fusing said toner images and said composition to a substrate.

2. A method of using thermoplastic ionomers to form a clear protective coating on color toner image printed by offset, inkjet or xerographic means, comprising the steps of:
    a) providing a coated transparent substrate having a wrong reading, color toner image formed thereon; and
    b) providing a backing member to said transparent substrate,
    wherein, the transparent substrate is coated with a protective coating comprised of thermoplastic ionomer.

3. A method of using thermoplastic ionomers to form a clear protective coating on color toner image printed by offset, inkjet or xerographic means, comprising the steps of:
    a) applying ink to a substrate to form an imaged element;
    b) either charging said imaged element to a given polarity or applying a voltage across the surface of said element which is attracted to a conductive surface behind said element;
    c) applying charged particles of thermoplastic ionomers to said element which causes the particles to be electrostatically attracted to the surface of said imaged element; and
    d) heat-fusing said particles to obtain a clear protective coating over the entire surface of said imaged element, wherein the thermoplastic ionomers have the structure

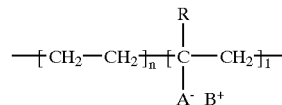

where n is from 10 to 20; R is selected from —H and —CH$_3$; A$^-$ is an anionic group and B$^+$ is a cationic group.

4. The method according to claim 3 wherein A$^-$ is selected from the group consisting of carboxylic acids, sulfonic acids, phosphonic acids and thioglycolic acids.

5. The method according to claim 3 wherein B$^+$ is selected from the group consisting of Na$^+$, K$^+$, Li$^+$, and Zn$^{2+}$.

6. The method according to claim 3 wherein the thermoplastic ionomers are selected from a group consisting of ethylene copolymers of methacrylic acid, ethylene copolymers of methacrylate salt, ethylene copolymers of acrylic acid, ethylene copolymers of acrylate salt and combinations thereof.

7. A protective coating comprising thermoplastic ionomers wherein the protective coating is formed on color toner image printed by offset, inkjet or xerographic means and wherein the thermoplastic ionomers have the structure

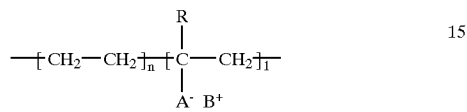

where n is from 10 to 20; R is selected from —H and —CH$_3$; A$^-$ is an anionic group and B$^+$ is a cationic group.

8. The protective coating according to claim 7 wherein A$^-$ is selected from the group consisting of carboxylic acids, sulfonic acids, phosphonic acids and thioglycolic acids.

9. The protective coating according to claim 7 wherein B$^+$ is selected from the group consisting of Na$^+$, K$^+$, Li$^+$ and Zn$^{2+}$.

10. The protective coating according to claim 7 wherein the thermoplastic ionomers are selected from a group consisting of ethylene copolymers of methacrylic acid, ethylene copolymers of methacrylate salt, ethylene copolymers of acrylic acid, ethylene copolymers of acrylate salt, and combinations thereof.

11. An apparatus for creating color toner images according to the method of claim 1, said apparatus comprising:

a) means including a plurality of developer housings for forming color toner images on a charge retentive surface;

b) means including a developer housing for depositing a protective coating composition comprising a clear polymer material on said charge retentive surface prior to the formation of said color toner images thereon, said clear polymer material comprising thermoplastic ionomers.

12. The apparatus according to claim 11 wherein the thermoplastic ionomers have the structure

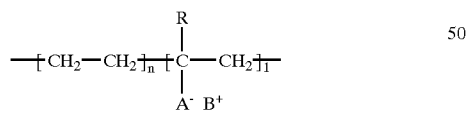

where n is from 10 to 20; R is selected from —H and —CH$_3$; A$^-$ is an anionic group and B$^+$ is a cationic group.

13. The apparatus according to claim 12 wherein A$^-$ is selected from the group consisting of carboxylic acids, sulfonic acids, phosphonic acids and thioglycolic acids.

14. The apparatus according to claim 12 wherein B$^+$ is selected from the group consisting of Na$^+$, K$^+$, Li$^+$ and Zn$^{2+}$.

15. The apparatus according to claim 12 wherein the thermoplastic ionomers are selected from a group consisting of ethylene copolymers of methacrylic acid, ethylene copolymers of methacrylate salt, ethylene copolymers of acrylic acid, ethylene copolymers of acrylate salt, and combinations thereof.

16. A thermal printer adapted to receive an ink-receiver substrate and an ink-donor web which includes a patch of thermally-transferable laminate material that can be applied onto the receiver medium over the dye image to form a protective layer, said thermal printer comprising:

a thermal printhead;

a transport system for moving received ink-receiver substrate and received ink-donor web past the thermal print head to transfer an ink image to the received ink-receiver medium;

means defining respective paths for the received ink-donor web and the received ink-receiver substrate, said paths converging in a forward direction, to a position at which they abut, before proceeding past the thermal print head;

drive means, as a part of the transport system, for moving the received ink-donor web and the received ink-receiver substrate (i) in said forward direction along their respective paths past the thermal head whereat heat from the thermal head causes an area of the laminate material coating between a leading edge of the area and a trailing edge of the area to transfer from the received ink-donor web to the received ink-receiver medium over the transferred dye image and (ii) in a reverse direction along their respective paths; and means for causing the trailing edge of the transferred area of the laminate material coating to break cleanly away from a portion of the laminate material coating not transferred from received web support to received ink-receiver substrate, leaving the trailing edge straight and even;

and wherein the laminate material comprises thermoplastic ionomer.

17. The apparatus according to claim 16 wherein the thermoplastic ionomers have the structure

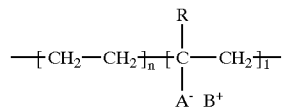

where n is from 10 to 20; R is selected from —H and —CH$_3$; A$^-$ is an anionic group and B$^+$ is a cationic group.

18. The apparatus according to claim 17 wherein A$^-$ is selected from the group consisting of carboxylic acids, sulfonic acids, phosphonic acids and thioglycolic acids.

19. The apparatus according to claim 17 wherein B$^+$ is selected from the group consisting of Na$^+$, K$^+$, Li$^+$ and Zn$^{2+}$.

20. The apparatus according to claim 17 wherein the thermoplastic ionomers are selected from a group consisting of ethylene copolymers of methacrylic acid, ethylene copolymers of methacrylate salt, ethylene copolymers of acrylic acid, ethylene copolymers of acrylate salt, and combinations thereof.

21. A method of using thermoplastic ionomers to form a clear protective coating on color toner image printed by offset, inkjet or xerographic means, comprising the steps of:

a) applying ink to a substrate to form an imaged element; and b) laminating a protective coating comprised of thermoplastic ionomers over the inkjet printed image by advancing the substrate and a laminate material past a heat source such that a portion of a patch of laminate material is applied to the substrate over the inkjet printed image, wherein the thermoplastic ionomers have the structure

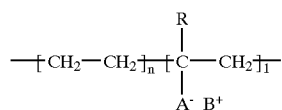

where n is from 10 to 20; R is selected from —H and —CH$_3$; A$^-$ is an anionic group and B$^+$ is a cationic group.

22. The method according to claim 21 wherein A$^-$ is selected from the group consisting of carboxylic acids, sulfonic acids, phosphonic acids and thioglycolic acids.

23. The method according to claim 21 wherein B$^+$ is selected from the group consisting of Na$^+$, K$^+$, Li$^+$, and Zn$^{2+}$.

24. The method according to claim 1 wherein the thermoplastic ionomers have the structure

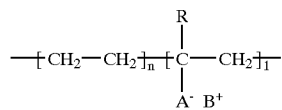

where n is from 10 to 20; R is selected from —H and —CH$_3$; A$^-$ is an anionic group and B$^+$ is a cationic group.

25. The method according to claim 24 wherein A$^-$ is selected from the group consisting of carboxylic acids, sulfonic acids, phosphonic acids and thioglycolic acids.

26. The method according to claim 24 wherein B$^+$ is selected from the group consisting of Na$^+$, K$^+$, Li$^+$, and Zn$^{2+}$.

27. The method according to claim 2 wherein the thermoplastic ionomers have the structure

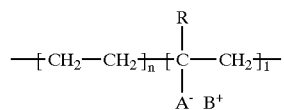

where n is from 10 to 20; R is selected from —H and —CH$_3$; A$^-$ is an anionic group and B$^+$ is a cationic group.

28. The method according to claim 27 wherein A$^-$ is selected from the group consisting of carboxylic acids, sulfonic acids, phosphonic acids and thioglycolic acids.

29. The method according to claim 27 wherein B$^+$ is selected from the group consisting of Na$^+$, K$^+$, Li$^+$, and Zn$^{2+}$.

30. The method according to claim 21 wherein the thermoplastic ionomers are selected from a group consisting of ethylene copolymers of methacrylic acid, ethylene copolymers of methacrylate salt, ethylene copolymers of acrylic acid, ethylene copolymers of acrylate salt, and combinations thereof.

31. The method according to claim 24 wherein the thermoplastic ionomers are selected from a group consisting of ethylene copolymers of methacrylic acid, ethylene copolymers of methacrylate salt, ethylene copolymers of acrylic acid, ethylene copolymers of acrylate salt, and combinations thereof.

32. The method according to claim 27 wherein the thermoplastic ionomers are selected from a group consisting of ethylene copolymers of methacrylic acid, ethylene copolymers of methacrylate salt, ethylene copolymers of acrylic acid, ethylene copolymers of acrylate salt, and combinations thereof.

* * * * *